United States Patent
Bodenstein et al.

(10) Patent No.: US 10,540,012 B2
(45) Date of Patent: Jan. 21, 2020

(54) INPUT DEVICE WITH AN INPUT COMPONENT MOVED BY AN ACTUATOR, WITH MECHANICAL TUNING FOR GENERATING AN IMPROVED HAPTIC FEEDBACK

(71) Applicant: PREH GMBH, Bad Neustadt a. d. Saale (DE)

(72) Inventors: Tobias Bodenstein, Salz (DE); Frederik Püschel, Bad Neustadt a. d. Saale (DE); Karl Göb, Steinbach (DE)

(73) Assignee: PREH GMBH, Bad Neustadt A. D. Saale (DE)

( * ) Notice: Subject to any disclaimer, the term of this patent is extended or adjusted under 35 U.S.C. 154(b) by 49 days.

(21) Appl. No.: 15/894,426

(22) Filed: Feb. 12, 2018

(65) Prior Publication Data
US 2018/0240613 A1    Aug. 23, 2018

(30) Foreign Application Priority Data

Feb. 22, 2017 (DE) .......................... 10 2017 103 670

(51) Int. Cl.
*G06F 3/01* (2006.01)
*H01H 3/02* (2006.01)
(Continued)

(52) U.S. Cl.
CPC ............... *G06F 3/016* (2013.01); *H01H 3/02* (2013.01); *G06F 3/04842* (2013.01);
(Continued)

(58) Field of Classification Search
CPC ........ B60K 2370/143; B60K 2370/158; B60K 37/06; G06F 3/016; G06F 3/041;
(Continued)

(56) References Cited

U.S. PATENT DOCUMENTS

| 6,429,846 | B2* | 8/2002 | Rosenberg | .............. | A63F 13/06 |
|  |  |  |  |  | 345/156 |
| 7,567,232 | B2* | 7/2009 | Rosenberg | .............. | G06F 3/016 |
|  |  |  |  |  | 345/156 |

(Continued)

FOREIGN PATENT DOCUMENTS

DE    102015008763 A1    1/2017

*Primary Examiner* — Dmitriy Bolotin
(74) *Attorney, Agent, or Firm* — M&B IP Analysts, LLC.

(57) ABSTRACT

An input device for generating improved haptic feedback. The input device includes a housing and an input component that defines a control surface and is movably supported on the housing with at least two degrees of freedom and associated mechanical natural frequencies. The input device is designed to assign a switching or controlling function to an operator touching or pressing the control surface, where the input device further has mechanical restoring means for restoring the input component into a rest position and an electromechanical actuator, where the actuator is designed to drive the input component along the at least two degrees of freedom and optionally decelerate the input component, counteracting the restoring force caused by the mechanical restoring means, in order to generate haptic feedback characterized in that the mechanical natural frequencies of the at least two degrees of freedom have a maximum deviation of less than 100 Hz.

10 Claims, 3 Drawing Sheets

(51) Int. Cl.
*G06F 3/0484* (2013.01)
*H01H 3/00* (2006.01)

(52) U.S. Cl.
CPC ... *H01H 2003/008* (2013.01); *H01H 2215/05* (2013.01); *H01H 2231/026* (2013.01)

(58) Field of Classification Search
CPC .. G06F 3/04842; G06F 3/0414; G06F 3/0416; H01H 2003/008; H01H 2215/05; H01H 2231/026; H01H 3/02; H01H 2003/0293
See application file for complete search history.

(56) References Cited

U.S. PATENT DOCUMENTS

| | | | | |
|---|---|---|---|---|
| 7,607,087 B2 * | 10/2009 | Prados | ............... | B60K 35/00 |
| | | | | 715/701 |
| 7,920,126 B2 * | 4/2011 | Prados | ............... | G06F 3/03547 |
| | | | | 345/156 |
| 8,026,902 B2 * | 9/2011 | Medler | ............... | G06F 3/0488 |
| | | | | 345/173 |
| 8,040,323 B2 * | 10/2011 | Prados | ............... | G06F 3/016 |
| | | | | 345/173 |
| 8,274,479 B2 * | 9/2012 | Prest | ............... | G06F 3/0338 |
| | | | | 345/169 |
| 8,739,033 B2 * | 5/2014 | Rosenberg | ............... | F41A 17/06 |
| | | | | 715/702 |
| 2005/0225539 A1 * | 10/2005 | Prados | ............... | B60K 35/00 |
| | | | | 345/173 |
| 2006/0250377 A1 * | 11/2006 | Zadesky | ............... | G06F 1/1613 |
| | | | | 345/173 |
| 2018/0107378 A1 * | 4/2018 | Rosenberg | ............... | G06F 3/016 |

\* cited by examiner

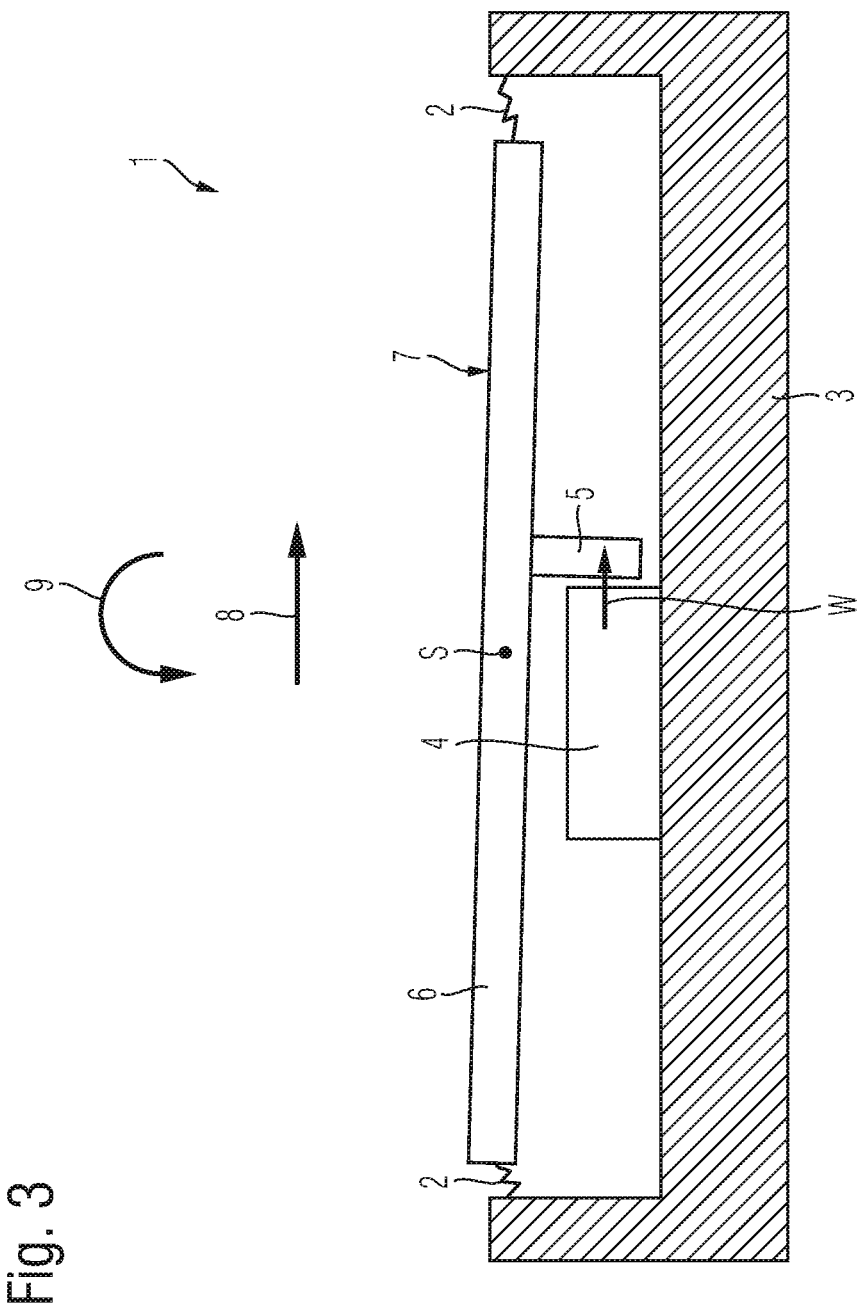

INPUT DEVICE WITH AN INPUT COMPONENT MOVED BY AN ACTUATOR, WITH MECHANICAL TUNING FOR GENERATING AN IMPROVED HAPTIC FEEDBACK

This application claims priority to the German Application No. 102017103670.9, filed Feb. 22, 2017, now pending, the contents of which are hereby incorporated by reference.

The present disclosure relates to an input device, particularly for a motor vehicle, with a housing and an input component which defines a control surface and is movably supported on the housing. For example, this is a touchpad, i.e. an input component defining a touch-sensitive control surface without a display, or a touchscreen, i.e. a combination of a touch-sensitive control surface and a display surface.

A touchscreen is known, for example, from DE 201 02 197 U1, with a haptic feedback.

With respect to haptic feedback, a touch control with a haptic feedback for inputting signals into a computer and for outputting forces to a user of the touch control is known from DE 201 80 024 U1 or the corresponding WO 01/54109 A1, wherein the touch control has an input component which has an approximately planar, touch-sensitive input surface which is operated in such a manner that it inputs a positional signal into a processor of the computer based on a position on the input surface touched by a user, wherein the positional signal represents the position in two dimensions. In addition, the touch control according to WO 01/54109 A1 has at least one actuator connected to the input component, wherein the actuator outputs a force to the input component in order to provide the operator touching the touch-sensitive input surface with haptic feedback, wherein the actuator outputs the force directly to the input component based on a force information output by the processor.

In addition, haptic feedback is known from U.S. Pat. No. 6,429,846, WO 03/038800 A1 and WO 03/41046 A1.

From DE 197 31 285 A1, a control member for a device with several selectable menus, functions and/or functional values is known, which has an input surface that can be handled by the user and via which the selection can be carried out through a local movement or touch on the input surface. The design of the input surface is variable in accordance with the selected and/or selectable menu, function and/or functional value.

DE 10 2014 019 196 A1 discloses an input device, particularly for a motor vehicle, with a housing and an input component which defines a control surface and is movably supported on the housing. The input device further has mechanical restoring means for restoring the input component into a rest position, and an electromechanical actuator, wherein the actuator is designed to movingly drive the input component in a motor-operated manner in order to generate a haptic feedback for the operator. The restoring means comprise a spring which has a pronounced elastic compliance in a direction corresponding to the excitation direction of the actuator and is configured to be comparatively bending-resistant with regard to the remaining degrees of freedom. However, it was found that a stimulation of movement or vibration in one of the degrees of freedom outside the stimulation of vibration whose degree of freedom is predetermined by the direction of action of the actuator and is hereinafter referred to as the intended stimulation of vibration cannot be suppressed completely and only with a comparatively large constructional effort. After many tests, it was also found, surprisingly, that such an unintended stimulation of vibration is perceived as troublesome only if its periodicity differs to a certain extent from the intended stimulation of vibration and if, rather, the perceptibility of the haptic feedback can be improved by these additional stimulations of vibration in a direction corresponding to the originally unintended degrees of freedom.

There is therefore a need for a generic input device with an improved haptic feedback which, in particular, can be given a comparatively simple constructional design. This object is achieved by an input device according to claim 1. A correspondingly advantageous use is the subject matter of the use claim. Advantageous embodiments are in each case the subject matter of the dependent claims. It must be remarked that the features cited individually in the patent claims can be combined in any technologically meaningful manner and depict other embodiments of the present disclosure. The description, in particular in connection with the figures, additionally characterizes and specifies the present disclosure.

The present disclosure relates to an input device. It comprises a housing and an input component defining a control surface. The term "housing" is to be construed broadly and does not necessarily require a design of the housing that encloses the input component. For example, the housing is configured as a frame. According to a further embodiment, the housing is configured to movably fix the input component to a vehicle component, such as a dashboard, an inner trim or the like.

According to the present disclosure, the input component is movably supported on the housing with at least two degrees of freedom and associated mechanical natural frequencies being provided. For example, the input component is supported on the housing so as to be transversally freely movable along two directions extending orthogonally to each other. Preferably, a first degree of freedom is defined by a translational movement along a direction parallel to the control surface and a second degree of freedom is defined by a rotary movement about an axis parallel to the control surface.

According to the present disclosure, the input device is designed to respectively assign a switching or controlling function to an operator touching the control surface and/or an operator pressing on the control surface, i.e. to the action of an operating force on the operating surface.

According to the present disclosure, the input device further has mechanical restoring means for restoring the input component into a rest position provided with respect to the at least two degrees of freedom. According to the present disclosure, the input device has an electromechanical actuator. According to the present disclosure, the actuator is designed to movingly drive the input component in a motor-operated manner along the at least two degrees of freedom and decelerate the input component, counteracting the restoring force caused by the mechanical restoring means, while applying a deceleration effect, in order to generate a haptic feedback for the operator by means of the driving action and optional deceleration. With respect to the respective degree of freedom, deceleration effect is understood to be a decrease over time of the associated vibration amplitude that exceeds the decrease resulting from damping in the freely vibrating input component. Typically, a decrease in amplitude of more than 70% from the previous vibration amplitude is understood to be a deceleration effect.

According to the present disclosure, the mechanical natural frequencies of the at least two degrees of freedom, e.g. of a rotary degree of freedom and a translational degree of freedom, are selected such that a deceleration effect with regard to the two degrees of freedom arises, preferably, that phase-synchronous vibrations with respect to the two degrees of freedom arise.

According to the present disclosure, the mechanical natural frequencies of the at least two degrees of freedom have a maximum deviation of less than 100 Hz. It was found that thus, the input component has a vibration behavior, such as periodicity, that is sufficiently aligned with regard to the at least two degrees of freedom by the remaining difference in said vibration behavior not being perceived as troublesome by the operator. Due to the aligned attunement of the mechanical natural frequencies and the aligned vibration behavior resulting therefrom, there is further the possibility, in the case of the optional deceleration of the input component, to achieve an effective deceleration with respect to the two degrees of freedom.

Preferably, the maximum deviation is less than 50 Hz, more preferably the maximum deviation is less than 25 Hz, most preferably less than 10 Hz.

According to a preferred embodiment of the input device according to the present disclosure, a first degree of freedom is defined by a translational movement along a direction parallel to the control surface and a second degree of freedom is defined by a rotary movement about an axis parallel to the control surface.

According to a preferred embodiment, the input component has a detection device for the spatially resolving detection of a touch on the control surface. For example, the detection device is designed to detect the touch capacitively, resistively, optically or inductively.

Preferably, the electromotive actuator is designed to move the input component from the rest position by means of an acceleration impulse along the at least two degrees of freedom and to decelerate it by means of a deceleration impulse prior to a return into the rest position. More preferably, the electromotive actuator is an electromagnetic actuator. For example, it has an electrical coil and an armature, preferably a flat armature, cooperating with the coil.

According to a preferred embodiment, the actuator is disposed in such a manner that its direction of action extends offset to a center of gravity of the input component. For example, the point of action of the actuator, i.e. the armature, is disposed offset to the center of gravity of the input component. In addition to the translational stimulation of movement by the actuator of the input component corresponding to the direction of action, a rotary stimulation of movement of the input component is thus also caused.

Preferably, the mechanical restoring means comprise one or more springs. For example, the springs are formed from spring steel.

Preferably, the spring respectively has one associated spring constant per degree of freedom, which is attuned in each case to the associated (i.e., corresponding to the degree of freedom) moment of inertia of the input component in such a way that the result is the predefined maximum deviation of the associated natural frequencies. Whereas in the prior art, for example, the springs merely exhibit an elastic compliance with respect to one degree of freedom and are configured to be comparatively bending-resistant with regard to the remaining degrees of freedom, the spring constants according to the present disclosure are approximately the same with regard to their amounts, for example with a deviation of some tens of N/m.

Preferably, the mechanical natural frequencies respectively are in the range from 5 Hz to 150 Hz, preferably in the range of 30 Hz to 75 Hz. It is the responsibility of the person skilled in the art to correspondingly set the respective natural frequencies through modal analysis, by means of the constructional design of the restoring means and the mass distribution of the input component.

Furthermore, the present disclosure relates to the use of the input device in one of the above-described embodiments in a motor vehicle.

The present disclosure is explained further with reference to the following figures. The Figures are to be understood only as examples and merely represent preferred embodiments. In the figures:

FIG. 3 shows the input device according to the present disclosure after the stimulation of movement by means of a deceleration impulse.

Figure 1:
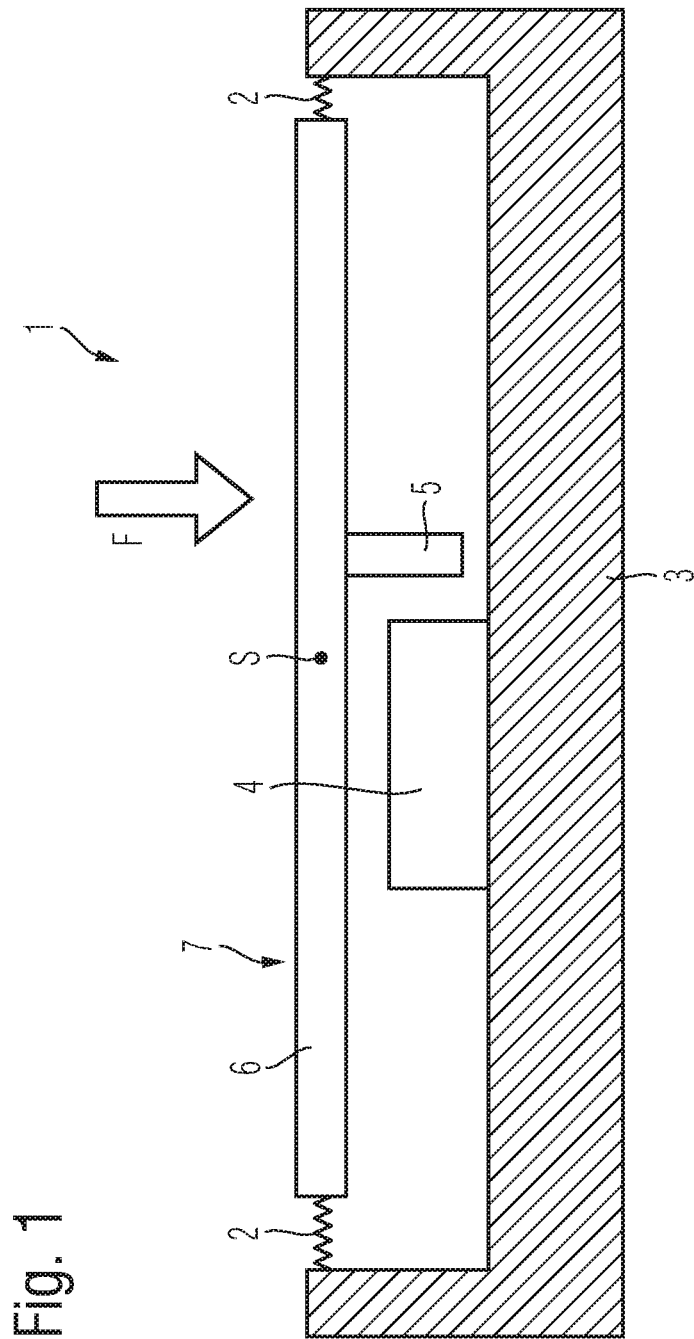
FIG. 1 shows the input device according to the present disclosure in the rest position.

The inventive input device 1 shown in FIG. 1 has a housing 3 and an input component 6 which defines a control surface 7 and is movably supported on the housing 3 with at least two degrees of freedom and associated mechanical natural frequencies being provided. The input device 1 is designed to respectively assign a switching or controlling function to an operator touching the control surface 7 and/or an operator pressing on the control surface 7 while applying an operating force F. The input device further 1 has mechanical restoring means 2 in the form of springs for restoring the input component 6 into the rest position shown in FIG. 1. S defines the center of gravity of the input component 6. The input device 1 has an electromechanical actuator 4, 5 comprising an electromagnetic coil 4 and an armature 5 cooperating with the magnetic field generated during the application of current to the coil, wherein the armature 5 is rigidly attached to the input component 6. The direction of action of the actuator 4, 5 is substantially parallel to the input surface 7. The actuator 4, 5 is designed to movingly drive the input component 6 in a motor-operated manner along the at least two degrees of freedom and to decelerate the input component 6, counteracting the restoring force caused by the mechanical restoring means 2, in order to generate a haptic feedback for the operator as is explained below with reference to the FIGS. 2 and 3. According to the present disclosure, the mechanical natural frequencies, which are each determined by the associated inertial mass and the associated spring constant of the restoring means 2 for the respective degree of freedom, have a difference not exceeding a predefined deviation, so that the periods, i.e. the period durations, of the vibrations corresponding to the respective degrees of freedom are approximately the same.

Figure 2:
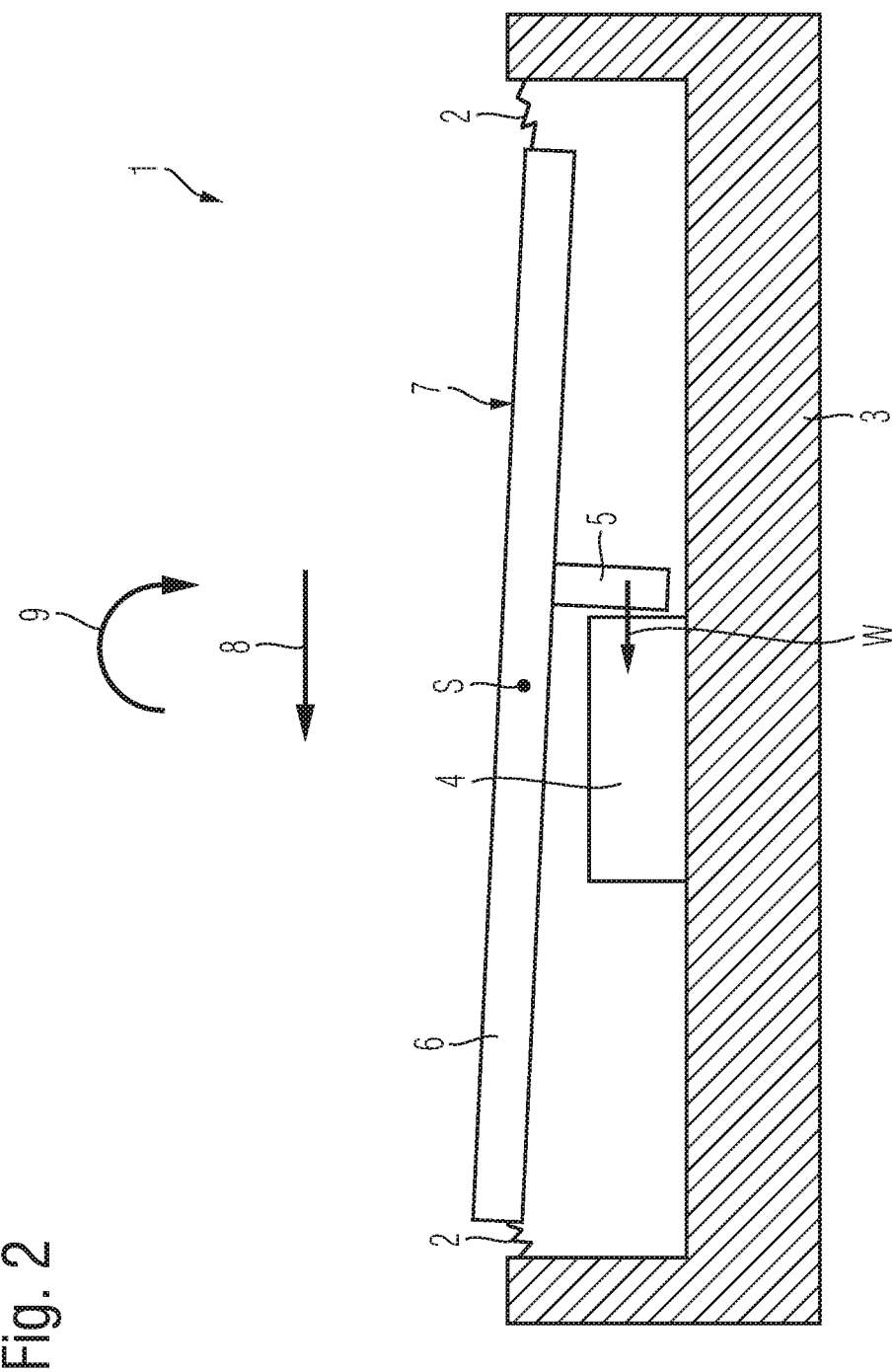
FIG. 2 shows the input device according to the present disclosure immediately after the stimulation of movement by means of an acceleration impulse.

FIG. 2 shows how an attraction between the coil 4 and the armature 5 with a direction of action corresponding to the arrow W is caused by means of the actuator 4, 5, which results, on the one hand, in a translational movement of the input component 6 corresponding to the arrow 8, but also, due to the position of the center of gravity S offset to the direction of action W, in a rotary stimulation movement of the input component 6 indicated by the arrow 9, both of which are subject to the restoring effect of the restoring means 2. Thus, the arrows 8, 9 represent the possible degrees of freedom stimulated by the actuator 4, 5. A translational vibration 8 and a rotary vibration 9 in phase therewith are achieved due to the almost matching natural frequencies. After reaching the respective maximum deflection of the transversal movement or of the rotary movement, but prior to reaching again the rest position of the input component 6 shown in FIG. 1, the input component 6 is subjected to a deceleration impulse by means of the actuator 4, 5, which results in the respective return movement of the transversal degree of freedom 8 or of the rotary degree of freedom 9 into the rest position being slowed down and reached, if possible, without overshoot of the input component 6. Thus, by attuning the mechanical natural frequencies, an approximately synchronous vibration behavior of the input component 6 with respect to its natural frequencies stimulated by the actuator 4, 5 is achieved, which provides the possibility of decelerating the input component 6 by means of a single deceleration impulse in a manner which is effective because it is almost synchronous.

What is claimed is:

1. An input device for generating improved haptic feedback, comprising:
    a housing;
    an input component which defines a control surface and is movably supported on the housing with at least two degrees of freedom and associated mechanical natural frequencies being provided, wherein the input device is designed to respectively assign a switching or controlling function to an operator touching the control surface or an operator pressing on the control surface;
    a mechanical restoring means for restoring the input component into a rest position; and
    an electromechanical actuator, wherein the actuator is designed to movingly drive the input component in a motor-operated manner along the at least two degrees of freedom and decelerate the input component, counteracting the restoring force caused by the mechanical restoring means, while applying a deceleration effect, in order to generate a haptic feedback for the operator;
    wherein the mechanical natural frequencies of the at least two degrees of freedom are selected to cause a deceleration effect with regard to the two degrees of freedom; and
    wherein a first degree of freedom is defined by a translational movement along a direction parallel to the control surface and a second degree of freedom is defined by a rotary movement about an axis parallel to the control surface.

2. The input device of claim 1, wherein in that the maximum deviation of the at least two degrees of freedom is less than 100 Hz.

3. The input device of claim 1, wherein the input component includes a detector for spatially resolving detection of a touch on the control surface.

4. The input device of claim 1, wherein the electromechanical actuator is configured to move the input component from the rest position by means of an acceleration impulse along the at least two degrees of freedom and to decelerate the input component by means of a deceleration impulse prior to a return into the rest position.

5. The input device of claim 1, wherein the electromechanical actuator is an electromagnetic actuator.

6. The input device of claim 1, wherein the electromechanical actuator is disposed in such a manner that its direction of action extends offset to a center of gravity of the input component.

7. The input device of claim 1, wherein the mechanical restoring means comprise one or more springs.

8. The input device of claim 7, wherein the spring respectively has one associated spring constant per degree of freedom, which is attuned in each case to the associated moment of inertia of the input component in such a way that the result is a predefined maximum deviation of the associated natural frequencies.

9. The input device of claim 1, wherein the mechanical natural frequencies are in the range of 5 Hz to 150 Hz.

10. An input device for generating improved haptic feedback, comprising:
    a housing;
    an input component which defines a control surface and is movably supported on the housing with at least two degrees of freedom and associated mechanical natural frequencies being provided, wherein the input device is designed to respectively assign a switching or controlling function to an operator touching the control surface or an operator pressing on the control surface;
    a mechanical restoring means for restoring the input component into a rest position; and
    an electromechanical actuator, wherein the actuator is designed to movingly drive the input component in a motor-operated manner along the at least two degrees of freedom and decelerate the input component, counteracting the restoring force caused by the mechanical restoring means, while applying a deceleration effect, in order to generate a haptic feedback for the operator;
    wherein the mechanical natural frequencies of the at least two degrees of freedom are selected to cause a deceleration effect with regard to the two degrees of freedom;
    wherein a first degree of freedom is defined by a translational movement along a direction parallel to the control surface and a second degree of freedom is defined by a rotary movement about an axis parallel to the control surface; and
    wherein the input device is configured to be connected to a vehicle.

* * * * *